(No Model.)
E. O'NEILL.
HAND TRUCK.
No. 552,696. Patented Jan. 7, 1896.
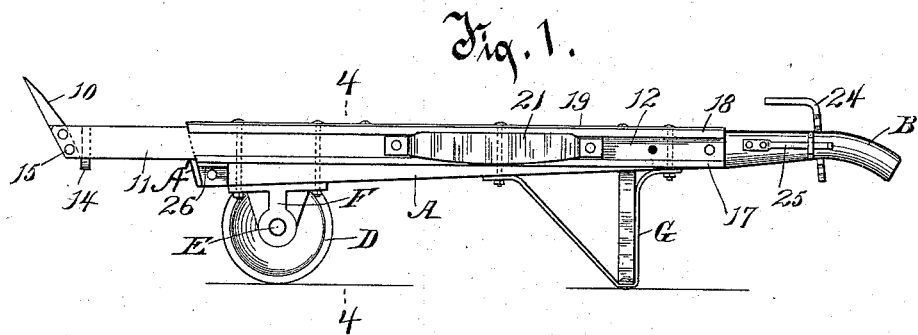
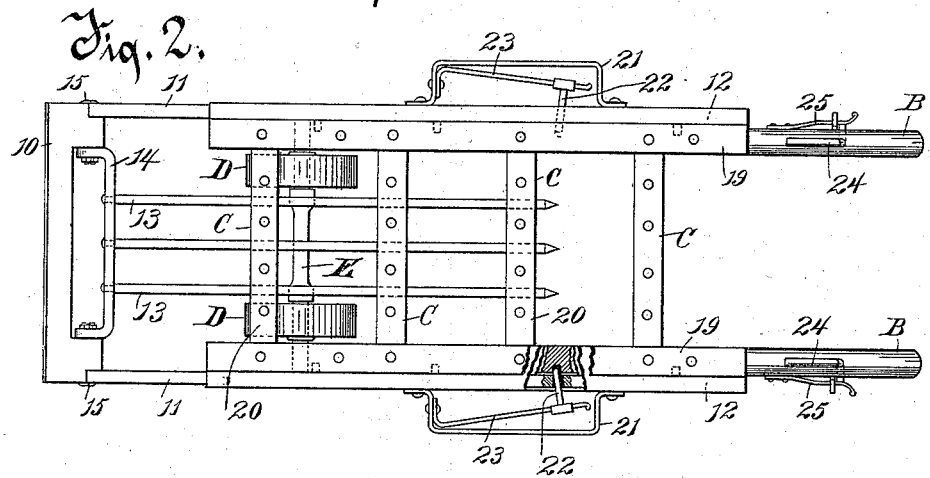
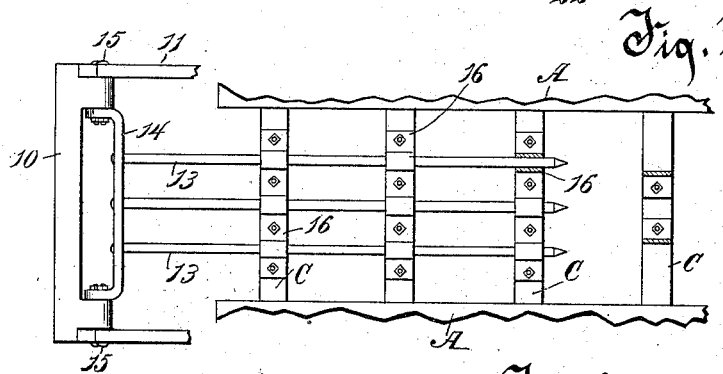
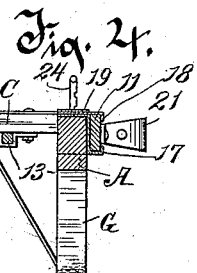
Witnesses.
Inventor.
Edward O'Neill
By Benedict & Morsell
Attorneys.

UNITED STATES PATENT OFFICE.

EDWARD O'NEILL, OF MILWAUKEE, WISCONSIN.

HAND-TRUCK.

SPECIFICATION forming part of Letters Patent No. 552,696, dated January 7, 1896.

Application filed March 18, 1895. Serial No. 542,094. (No model.)

*To all whom it may concern:*

Be it known that I, EDWARD O'NEILL, of Milwaukee, in the county of Milwaukee and State of Wisconsin, have invented a new and useful Improvement in Hand-Trucks, of which the following is a description, reference being had to the accompanying drawings, which are a part of this specification.

My invention relates to improvements in hand-trucks of the class that are used in warehouses, freight-depots, baggage-rooms, and elsewhere, for conveniently transporting trunks, boxes, barrels and other similar articles.

The invention consists chiefly of devices in and by which the bed of the truck is enlarged, and thereby made capable of supporting larger or a greater number of articles than the ordinary hand-truck can carry, and of other devices incidental thereto.

In the drawings, Figure 1 is a side elevation of my improved hand-truck. Fig. 2 is a top plan view of the improved truck, parts being broken away to better illustrate the construction. Fig. 3 is an under side plan view of a fragment of the truck-frame, and of some features of my improved devices in connection therewith. Fig. 4 is a vertical transverse section of the improved truck on line 4 4 of Fig. 1, looking toward the right.

The bed or frame of the truck may be of any suitable construction, and as commonly and suitably made consists of the longitudinal side rails A A, the rear extremities of which are so formed as to be handles B B, adapted to be grasped by the hand when the truck is being used. Cross-rails C C are secured rigidly to the side rails, and these together form the bed or frame of the truck. Two wheels D D on an axle E, which axle is journaled in boxes F F secured to the under side of the rails B B near their front extremities, support the front end of the truck-frame, and the entire truck and its load, when the rear end is raised and the truck is being used as a means for transportation of articles. Legs G G secured to the frame near its rear end, support the truck-frame at that end when the legs are permitted to rest on the floor, and these legs are of such length, ordinarily, that the truck-frame supported on the wheels and on these legs is substantially level. Trucks of the general construction so far described, are in common use.

In my improved truck a transverse headbar 10 is secured at an oblique angle thereto, to movable side rails 11 11, which side rails are fitted to and adapted to slide longitudinally in ways 12 12 therefor on the rails A. Other rails or rods 13 are secured at their front ends to the head-piece 10, and extend therefrom rearwardly parallel with the side rails, movably through supports in or secured to the cross-rails C. This construction, so generally described, forms an extensible auxiliary frame, adapted by its extension forwardly beyond the front end of the main frame to enlarge the bed of the truck, whereby the truck is adapted for transporting a larger number of boxes, barrels or articles, than it could otherwise carry.

In the details of construction, the head-piece 10 is recessed at its extremities and lower edge to receive and fit onto the side rails 11 11, and at its lower edge is also preferably recessed centrally, receiving therein the extremities of a yoke 14, through the extremities of which yoke and through the extremities of the head-piece 10 and the rails 11 bolts 15 15 are inserted, thereby securing the parts together firmly but releasably. The rods 13 are secured to the head-piece 10 conveniently by being fixed in the yoke 14. The number of the rods 13 is not important, except that enough must be provided to make with the rails 11 a suitable bed for the extensible or auxiliary portion of the frame. The construction described places the transverse and principal portion of the yoke 14 at a little distance from the head opposite thereto, and this admirably adapts the construction for receiving a barrel thereon which it is desired to hold with its open end upwardly while being transported. The rods 13 are conveniently supported movably on the cross-rails C by means of brackets 16 secured to the under sides of the cross-rails, said brackets being provided with grooves or sockets for the rods 13.

The ways 12 on the sides of the rails A are conveniently constructed of brackets secured thereto, there being a lower ledge 17 and an upper ledge 18, which ledges extend outwardly beyond, and turn over in front laterally of the rails 11, thereby constructing channels or ways in which the rails 11 are fitted and slide endwise. These brackets are preferably provided with flanges or extensions which lie upon the tops of the rails A, and other plates 19 are preferably placed over these flanges above the rails, and are secured thereto, forming, with other plates 20 on the cross-rails C, an enduring floor on the main frame. For conveniently extending and withdrawing the auxiliary frame on the main frame, I provide laterally-extending handles 21 secured to the rails 11, which may be grasped by the user for shifting the auxiliary frame. I also provide means for securing the auxiliary frame in place on the main frame when it has been adjusted, which means consists preferably of pins 22 adapted to be inserted through apertures therefor in the rails 11 into registering apertures in the rails A at different points in their sides. These pins 22 are carried on springs 23, which springs are adapted to hold the pins releasably in the apertures in the rails A. The springs are mounted directly on the rails 11 or, more conveniently for use, indirectly thereon, by being attached directly to the handles 21. The front ends of the rails A and the ways 12 thereon are so constructed that when the auxiliary frame is retrieved or drawn inwardly to the limit of its travel, the head-piece 10 rests on and is supported by the forwardly-projecting portions A' of the extremities of the rails A. I also preferably provide brackets 26, which are secured to the rails A near their front extremities, directly under the ledges 17, which brackets are adapted to reinforce the ledges and thereby strengthen the device at this point.

It sometimes occurs that a large truck of this kind will be moved with difficulty by merely grasping the handles B, which are substantially horizontal. To obviate this difficulty and also to provide means by which a tall man using this truck can do so conveniently without lifting the handles so high as to bring the extended front end against the floor, rods 24 24 bent substantially at right angles and forming auxiliary handles are used. One arm of these auxiliary handles passes movably through nearly vertical apertures in the handles B, and are secured adjustable vertically therein by means of springs 25, secured to the handles B and provided with pins that pass movably through the handles B and enter recesses therefor in the arms of the handles 24. It will be understood that the vertical portions of these handles above the rails B can be grasped for hauling the truck and its load along, and that a tall man can grasp the horizontal member of the handles and thus support the rear end of the truck-frame at a less height from the floor than could conveniently be done if he were compelled to grasp the handles B.

Having thus described my invention, what I claim, and desire to secure by Letters Patent, is—

1. The combination with the main frame of a hand truck mounted on wheels at its front end, of an auxiliary extensible frame sliding on the main frame and extensible thereon beyond the wheels toward the front, substantially as described.

2. The combination with the main frame of a hand truck having wheels near its front end and provided with longitudinal ways, of an extensible auxiliary frame including the head piece of the truck and side rails adapted to slide in ways on the main frame whereby the bed of the truck can be extended at the front end, substantially as described.

3. In a truck, the combination with a main frame, of an auxiliary frame comprising the transverse head piece of the truck, said rails secured to and extending rearwardly from the head piece, intermediate rods or rails secured to the head piece, and devices on the main frame in which the side and intermediate rails are received and slide, the auxiliary frame being adapted to extend beyond the main frame at its front, substantially as described.

4. In a truck, the combination with a main frame, of an auxiliary frame comprising a transverse head piece, side rails and intermediate rods or rails secured to and extending rearwardly from the head piece, ways on the main frame in which the side and intermediate rails are received and slide, and means for securing the auxiliary frame releasably and adjustably to the main frame, substantially as described.

5. In a truck having substantially horizontal handles, the combination therewith of auxiliary vertically adjustable handles, substantially as described.

In testimony whereof I affix my signature in presence of two witnesses.

EDWARD O'NEILL.

Witnesses:
C. T. BENEDICT,
ANNA V. FAUST.